Felix Brown's Improvement in Block-Sugar-Machines.

109296

Patented Nov 15 1870

Nicholas Hollard.
Henry O'Kelly.

Felix Brown
per Boyd Eliot
Atty for inventor

United States Patent Office.

FELIX BROWN, OF NEW YORK, N. Y.

Letters Patent No. 109,296, dated November 15, 1870.

IMPROVEMENT IN MACHINES FOR CUTTING LOAF-SUGAR.

The Schedule referred to in these Letters Patent and making part of the same.

I, FELIX BROWN, of the city, county, and State of New York, have invented certain Improvements in Machines for "Cutting Loaf-Sugar," of which the following is a specification.

Nature and Object.

My invention relates to that class of machines which convert the well-known loaf-sugar of commerce into small cubical blocks, and was first patented to A. and F. Brown March 26, 1856, and which has recently been extended for seven (7) years.

In that invention, and all others following it to the present, the first operation consisted in cutting the loaves into slabs of a thickness equal to one dimension of the blocks to be formed, and these were then fed to the devices for forming the cubes.

The object of this invention is to make the entire operation automatic, and at the same time introduce a new method of sawing, by which a great saving of the loaf is effected and the machine greatly increased in its working capacity.

Drawing.

Figure 1 is a side elevation of my invention, and arranged in close proximity to the old cutting-machine above referred to.

A is the loaf of sugar, placed upon a guide or table, B, mounted in any convenient manner upon a frame, C, which supports the saws D and E.

Said guide B is so connected with the other working parts, as at G, that when a loaf is placed on it and held in position by some clamping devices, as at H, a reciprocating motion will be imparted to the loaf carrying the frame over the saws D, which are arranged to extend up through the guide B, and above it sufficiently far to score the base of the loaf to the depth that the blocks are to be formed, and said scores or curfs will also be of the same distance apart, so that when said scores are removed from the end of the loaf that which was previously a slab will be cut into strips, whose cross-section will be a square.

Figure 1:
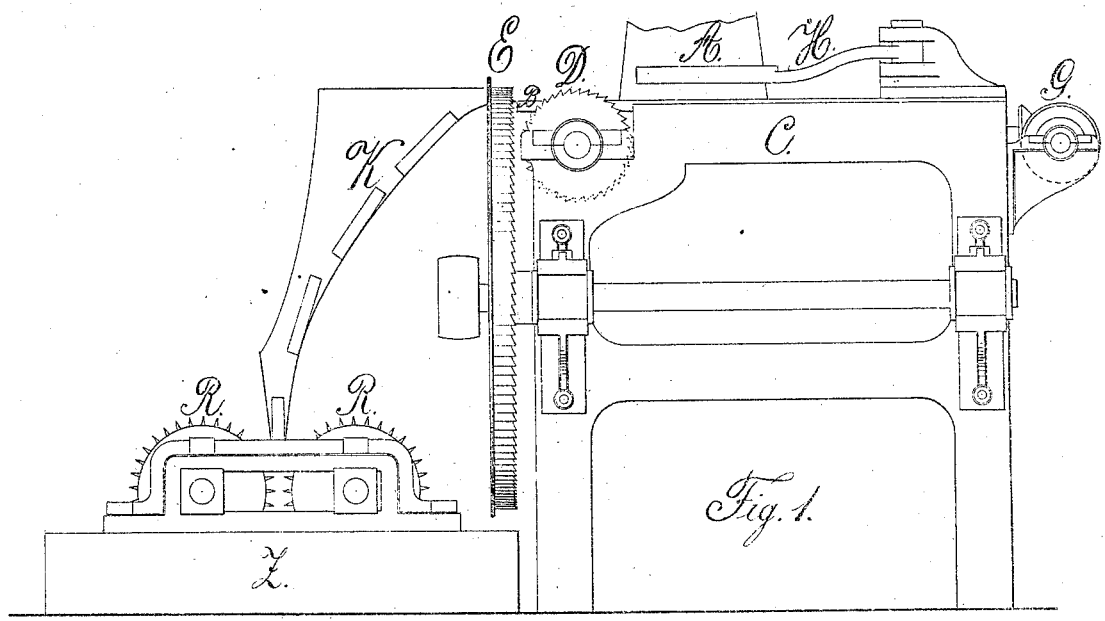
Figure 2:
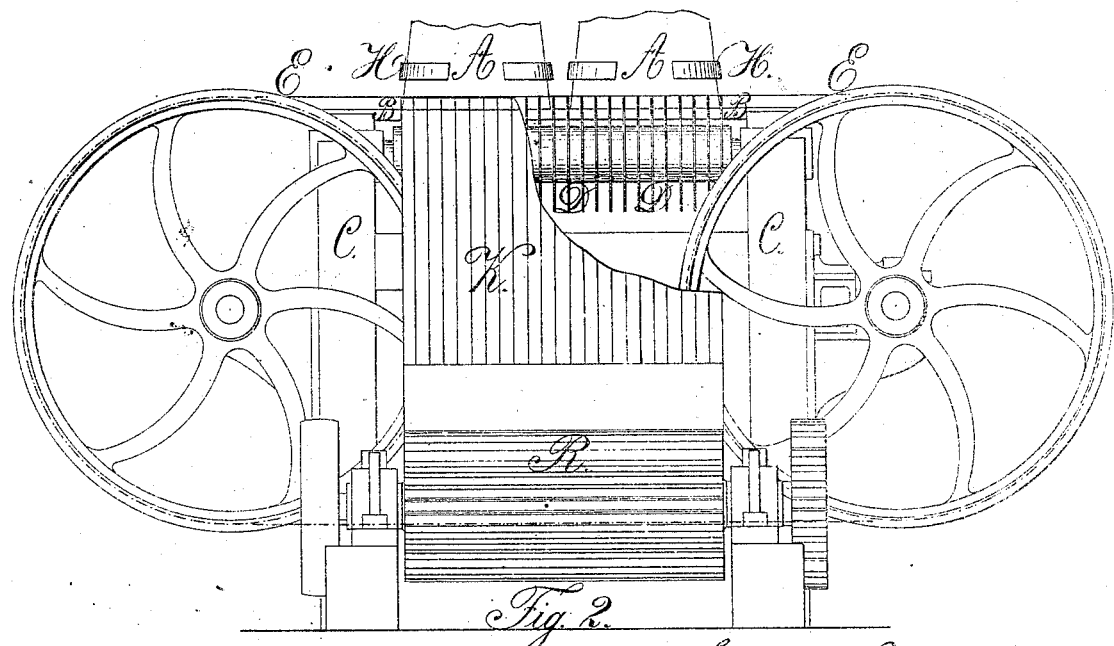
Figure 2 is a front elevation of fig. 1.

To separate said strips, a band-saw, as shown at E, is mounted upon suitable pulleys, and run in such proximity to the guide B that, if the loaf be carried out against said saw, the strips formed by the saws D will be severed therefrom, and be carried by suitable guides, as at K, to the rolls R R, where they are cut into blocks by corresponding knives in the peripheries of said rolls, as indicated at Z, fig. 1.

The advantages of such an arrangement are—

First, that the machines can be increased in width, so that more than one loaf can be placed upon the table at a time, as the band-saw may be of any length.

Second, the operations are all automatic, so that but little attention is required for running the machine.

Third, the band-saw can be made so much thinner than the circular saws now used for such purposes that less than one-half the waste is produced by the sawing operation when performed by this invention.

Claims.

1. The combination of a guide, B, with saws D D, for scoring or grooving the sugar loaf, as described, and for the purposes set forth.

2. In combination with a guide, B, the band-saw E, for cutting off said scored or grooved portions of the loaf, as described.

3. The guides K, for conducting the severed strips of sugar from the band-saw to the nipping-rolls, as described.

4. The clamping device, in combination with the sliding or moving guide, for holding the uncut portions of the loaf, as described, and for the purposes set forth.

FELIX BROWN.

Witnesses:
BOYD ELIOT,
NICHOLAS DOLLARD.